United States Patent
Micke

(10) Patent No.: US 11,208,088 B2
(45) Date of Patent: Dec. 28, 2021

(54) ELECTROHYDRAULIC POWER PRESSURE GENERATOR

(71) Applicant: Robert Bosch GmbH, Stuttgart (DE)

(72) Inventor: Marc Micke, Boennigheim (DE)

(73) Assignee: Robert Bosch GmbH, Stuttgart (DE)

(*) Notice: Subject to any disclaimer, the term of this patent is extended or adjusted under 35 U.S.C. 154(b) by 315 days.

(21) Appl. No.: 16/462,620

(22) PCT Filed: Oct. 5, 2017

(86) PCT No.: PCT/EP2017/075316
§ 371 (c)(1),
(2) Date: May 21, 2019

(87) PCT Pub. No.: WO2018/099636
PCT Pub. Date: Jun. 7, 2018

(65) Prior Publication Data
US 2020/0062231 A1   Feb. 27, 2020

(30) Foreign Application Priority Data

Nov. 30, 2016   (DE) .......................... 102016223736.5

(51) Int. Cl.
*F16H 25/20*   (2006.01)
*B60T 13/74*   (2006.01)

(52) U.S. Cl.
CPC ............ *B60T 13/745* (2013.01); *F16H 25/20* (2013.01); *B60T 2270/10* (2013.01); *B60T 2270/20* (2013.01); *B60T 2270/30* (2013.01); *F16H 2025/2075* (2013.01); *F16H 2025/2087* (2013.01)

(58) Field of Classification Search
CPC ............ F16H 25/20; F16H 2025/2075; F16H 2025/2087; B60T 13/745; B60T 2270/10; B60T 2270/20; B60T 2270/30
See application file for complete search history.

(56) References Cited

U.S. PATENT DOCUMENTS 4,629,038 A * 12/1986 Pressaco ............... F16D 65/567
188/196 D
6,746,088 B2 * 6/2004 Chris ..................... B60T 7/042
188/358

(Continued)

FOREIGN PATENT DOCUMENTS

| CN | 104080670 A | 10/2014 |
|---|---|---|
| CN | 105221614 A | 1/2016 |

(Continued)

OTHER PUBLICATIONS

International Search Report for PCT/EP2017/075316, dated Jan. 25, 2018.

*Primary Examiner* — David M Fenstermacher
(74) *Attorney, Agent, or Firm* — Norton Rose Fulbright US LLP; Gerard Messina

(57) ABSTRACT

An electrohydraulic power pressure generator for a vehicle braking system which includes an electric motor, a planetary gear, a screw drive, and a piston cylinder unit. To prevent the brake fluid from entering the electric motor, there is a drive shaft between the electric motor and the planetary gear which is rotatably fixedly connected to a motor shaft via a slot coupling and which is sealed by a radial shaft sealing ring.

5 Claims, 1 Drawing Sheet

(56) References Cited

U.S. PATENT DOCUMENTS

| | | | | |
|---|---|---|---|---|
| 7,112,058 B2* | 9/2006 | Felix | ............... | B29C 45/68 |
| | | | | 425/451.7 |
| 7,748,308 B2* | 7/2010 | Anderson | ............... | B30B 1/18 |
| | | | | 91/61 |
| 8,104,589 B2* | 1/2012 | Ollat | ............... | B60T 13/588 |
| | | | | 188/72.6 |
| 8,490,758 B2* | 7/2013 | Ollat | ............... | B60T 13/588 |
| | | | | 188/72.8 |
| 9,834,190 B2* | 12/2017 | Kim | ............... | B60T 13/686 |
| 10,315,639 B2* | 6/2019 | Choi | ............... | B60T 13/662 |
| 10,821,953 B2* | 11/2020 | Jeong | ............... | B60T 13/145 |
| 10,906,519 B2* | 2/2021 | Jeong | ............... | B60T 15/028 |

FOREIGN PATENT DOCUMENTS

| | | |
|---|---|---|
| CN | 105438157 A | 3/2016 |
| EP | 0729871 A1 | 9/1996 |
| KR | 20070062741 A | 6/2007 |
| WO | 2013023953 A1 | 2/2013 |
| WO | 2014001138 A2 | 1/2014 |

* cited by examiner

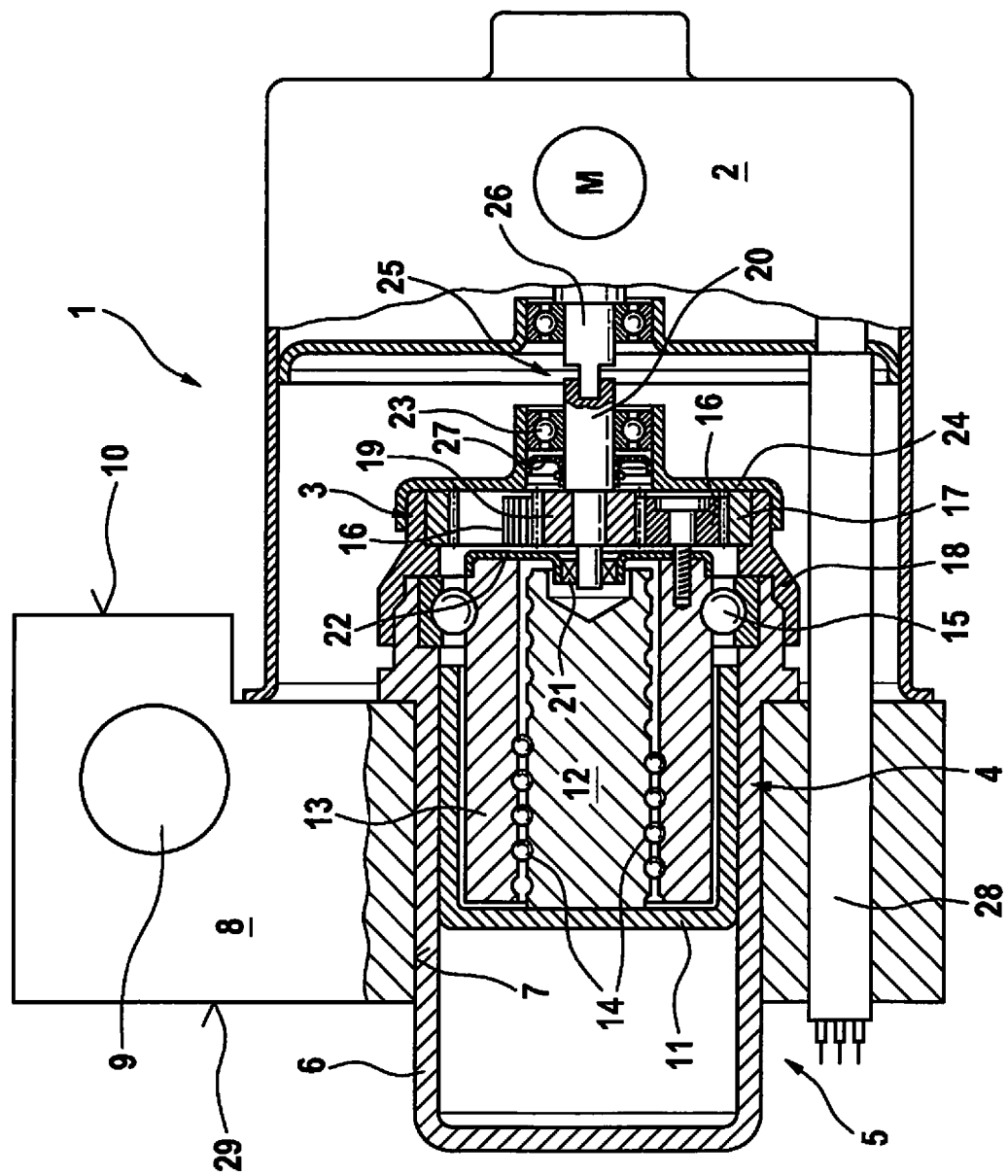

ELECTROHYDRAULIC POWER PRESSURE GENERATOR

FIELD OF THE INVENTION

The present invention relates to an electrohydraulic power pressure generator for a hydraulic vehicle braking system having the features.

BACKGROUND INFORMATION

International patent application WO 2013/023 953 A1 provides an electrohydraulic power pressure generator for a hydraulic vehicle braking system including an electric motor, a piston cylinder unit and a screw drive which converts a rotary drive movement of the electric motor into a linear output movement for displacing a piston in a cylinder of the piston cylinder unit. The electric motor, the screw drive, and the piston cylinder unit are situated on the same axis; the screw drive is located between the electric motor and the piston cylinder unit and the piston cylinder unit is situated in the axial extension of the electric motor.

SUMMARY OF THE INVENTION

The electrohydraulic power pressure generator according to the present invention having the features described herein includes an electric motor, a piston cylinder unit, and a screw drive which translates a rotary drive movement of the electric motor into a linear output movement and which is driven by the electric motor, and which displaces a piston in a cylinder of the piston cylinder unit. To seal the electric motor from the brake fluid coming from the piston cylinder unit or from a hydraulic block of a hydraulic vehicle braking system, for example, at which the electric motor is fastened, the pressure generator according to the present invention includes a shaft seal on a drive shaft between the electric motor and the screw drive. The drive shaft transfers a rotary drive movement of the electric motor to the screw drive.

The further descriptions herein provide advantageous embodiments and refinements of the object of the present invention provided herein.

The drive shaft may be a motor shaft of the electric motor. A further embodiment provides an intermediate shaft as the drive shaft which transfers a rotary drive movement of the electric motor to the screw drive. The intermediate or drive shaft is rotatably fixedly connected via a coupling to the motor shaft of the electric motor. The coupling is in particular torsionally stiff or torsionally elastic and which may be axially, radially and/or angularly movable to compensate for axial, radial and/or angle errors and/or movements between the motor shaft and the screw drive during the operation of the pressure generator. Examples of such couplings are gear, claw, slot and cross-slot couplings.

A further embodiment provides a planetary gear as the reduction gear between the electric motor and the screw drive, which is driven by the electric motor and drives the screw drive.

The present invention is elucidated in greater detail below on the basis of one specific embodiment illustrated in the drawing.

BRIEF DESCRIPTION OF THE DRAWING

The FIGURE shows an axial section of an electrohydraulic power pressure generator according to the present invention in a simplified illustration.

DETAILED DESCRIPTION

Electrohydraulic power pressure generator 1 according to the present invention, which is shown in the drawing, is provided to generate a brake pressure in a hydraulic power vehicle braking system. It includes an electric motor 2, a planetary gear 3, a screw drive 4, and a piston cylinder unit 5 which are situated in the provided sequence axially one after another and partially meshing with one another. A cylinder 6 of piston cylinder unit 5 is situated in a power cylinder bore 7 in a hydraulic block 8 of a brake control of the vehicle braking system.

Hydraulic block 8 is used to generate the brake pressure and to control the brake pressure of the vehicle braking system, for which purpose, in addition to power pressure generator 1 according to the present invention, it also includes (not depicted) solenoid valves, check valves, pressure sensors, hydraulic accumulators, and damping chambers for the purpose of generating brake pressure. Furthermore, hydraulic block 8 includes a main brake cylinder bore 9 for accommodating a main brake cylinder. The above-named hydraulic components are hydraulically interconnected according to a hydraulic circuit diagram of the brake control through a bore of hydraulic block 8 (not depicted). The brake control is used to control a brake pressure in the case of a service braking and allows for slip controls, such as anti-lock systems, traction control systems and/or a vehicle dynamics control systems/electronic stability programs, for which the abbreviations ABS, TCS, VDC and ESP are commonly used. Such brake controls and slip controls as well as hydraulic blocks are known per se and will not be elucidated here in greater detail.

Power cylinder bore 7 passes through hydraulic block 8 and cylinder 6 of piston cylinder unit 5 of power pressure generator 1 according to the present invention protrudes from hydraulic block 8 on a side opposite to electric motor 2. Electric motor 2 is fastened on the outside of hydraulic block 8 at a motor side 10.

A piston 11 of piston cylinder unit 5 is configured as a hollow piston in which screw drive 4 is accommodated. In the illustrated and described specific embodiment of the present invention, screw drive 4 is a ball screw including a rotatably fixed spindle 12, which is rigidly connected to piston 11, to a rotatable tubular nut 13, which coaxially encloses spindle 12 in piston 11, and to balls 14 as rolling elements between nut 13 and spindle 12. A rotary drive of nut 13 displaces spindle 12 and together with it, displaces piston 11 in cylinder 6 of piston cylinder unit 5. Nut 13 of screw drive 4 is rotatably mounted together with a ball bearing 15 which is situated at an open end of cylinder 6 facing electric motor 2. Screw drives other than ball screws are also possible, the present invention is not limited to ball screws as screw drive 4.

Nut 13 of screw drive 4 forms a planetary carrier of planetary gear 3: planet wheels 16 of planetary gear 3 are rotatably mounted at the front end of nut 13 facing electric motor 2. An annulus gear 17 of planetary gear 3 is rigidly fastened to a ring-shaped holder 18 at the open end of cylinder 6 facing electric motor 2.

A sun wheel 19 of planetary gear 3 is rotatably fixedly situated on a drive shaft 20 which is rotatably mounted on both sides of planetary gear 3: on the side of screw drive 4, drive shaft 20 is rotatably mounted in a bearing bush which may in general be understood as a pivot bearing 21 and which is fastened at a bearing shield 22 at a front end of nut 13 of screw drive 4 which faces planetary gear 3 and electric motor 2 at the same time. On the other side of planetary gear 3, i.e. on the side facing electric motor 2, drive shaft 20 including a ball bearing 23 is rotatably mounted which is situated in a bearing shield 24 which is fastened at holder 18 of annulus gear 17 and thus at cylinder 6 of piston cylinder unit 5. Drive shaft 20 including its ball bearing 23 is rotatably mounted at screw drive 4 including ball bearing 15 at cylinder 6 via the pivot bearing of nut 13 of screw drive 4.

Drive shaft 20 is an intermediate shaft which is torsionally stiffly connected to a motor shaft 26 of electric motor 2 via a slot coupling 25. Slot coupling 25 compensates for the axial, radial, and angular offset between motor shaft 26 and drive shaft 20. Other, for example also torsionally elastic, form fit or friction lock couplings are possible for transferring a rotary movement from motor shaft 26 of electric motor 2 to drive shaft 20 with the aid of its rotatably fixed sun wheel 19 of planetary gear 3.

A radial shaft sealing ring is situated between electric motor 2 and planetary gear 3 as shaft seal 27 on drive shaft 20. In the illustrated specific embodiment of the present invention, shaft seal 27 is located between ball bearing 23, which rotatably mounts drive shaft 20, and sun wheel 19 or planetary gear 3. Shaft seal 27 is situated in bearing shield 24 of ball bearing 23. Shaft seal 27 prevents the brake fluid from entering electric motor 2 from cylinder 6 of piston cylinder unit 5 or from hydraulic block 8.

For the purpose of its electrical connection and electronic commutation, electric motor 2 includes a tubular cable bushing 28 which protrudes from electric motor 2 on the side of piston cylinder unit 5 in an axis-parallel manner. Cable bushing 28 runs through a passage-hole in hydraulic block 8 to an opposite control unit side 29. On control unit side 29 of hydraulic block 8, an electronic control unit of the brake control (not depicted) is fastened which controls the solenoid valves (not depicted) and electric motor 2 and receives signals from the pressure sensors, a rotation or rotation angle sensor of electric motor 2, and wheel speed sensors of the vehicle wheels. The electronic control unit is connected to electric motor 2 via cable bushing 28. The connection and commutation cables of electric motor 2 are located in cable bushing 28. Shaft seal 27 prevents the brake fluid from flowing from cylinder 6 of piston cylinder unit 5 or from hydraulic block 8 through a motor housing of electric motor 2 into cable bushing 28 and from there into the electronic control unit.

What is claimed is:

1. An electrohydraulic power pressure generator for a hydraulic vehicle braking system, comprising:
   a piston cylinder unit;
   an electric motor; and
   a screw drive which converts a rotary drive movement of the electric motor into a linear output movement for displacing a piston in a cylinder of the piston cylinder unit;
   wherein the pressure generator includes a shaft seal on a drive shaft between the electric motor and the screw drive, and
   wherein the drive shaft includes an intermediate shaft which is rotatably fixedly connected via a coupling to a motor shaft of the electric motor.

2. The electrohydraulic power pressure generator of claim 1, wherein the electric motor includes in parallel to the piston cylinder unit a tubular cable bushing which extends over at least a portion of a length of the cylinder of the piston cylinder unit.

3. An electrohydraulic power pressure generator for a hydraulic vehicle braking system, comprising:
   a piston cylinder unit;
   an electric motor; and
   a screw drive which converts a rotary drive movement of the electric motor into a linear output movement for displacing a piston in a cylinder of the piston cylinder unit;
   wherein the pressure generator includes a shaft seal on a drive shaft between the electric motor and the screw drive, and
   wherein the drive shaft includes an intermediate shaft which is rotatably mounted to the screw drive via a pivot bearing.

4. An electrohydraulic power pressure generator for a hydraulic vehicle braking system, comprising:
   a piston cylinder unit;
   an electric motor; and
   a screw drive which converts a rotary drive movement of the electric motor into a linear output movement for displacing a piston in a cylinder of the piston cylinder unit;
   wherein the pressure generator includes a shaft seal on a drive shaft between the electric motor and the screw drive, and
   wherein a planetary gear, which is driven by the electric motor and which drives the screw drive, is situated between the electric motor and the screw drive, and a sun wheel of the planetary gear is rotatably fixedly connected to the drive shaft.

5. The electrohydraulic power pressure generator of claim 4, wherein the drive shaft is rotatably mounted at the screw drive on both sides of the planetary gear.

* * * * *